Figure 7:
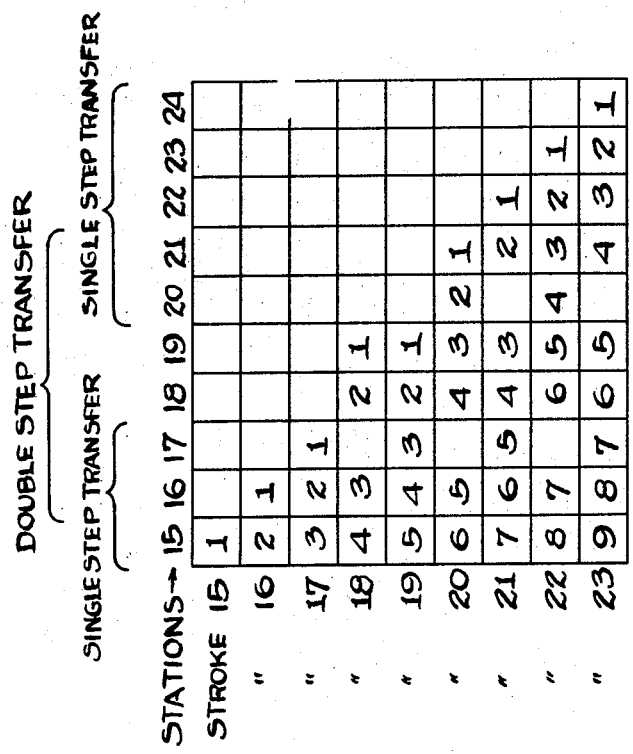

Sept. 22, 1964
R. SOMAN
3,149,712
BODY TRANSFERRING METHOD AND APPARATUS
Filed Oct. 21, 1960
5 Sheets—Sheet 1
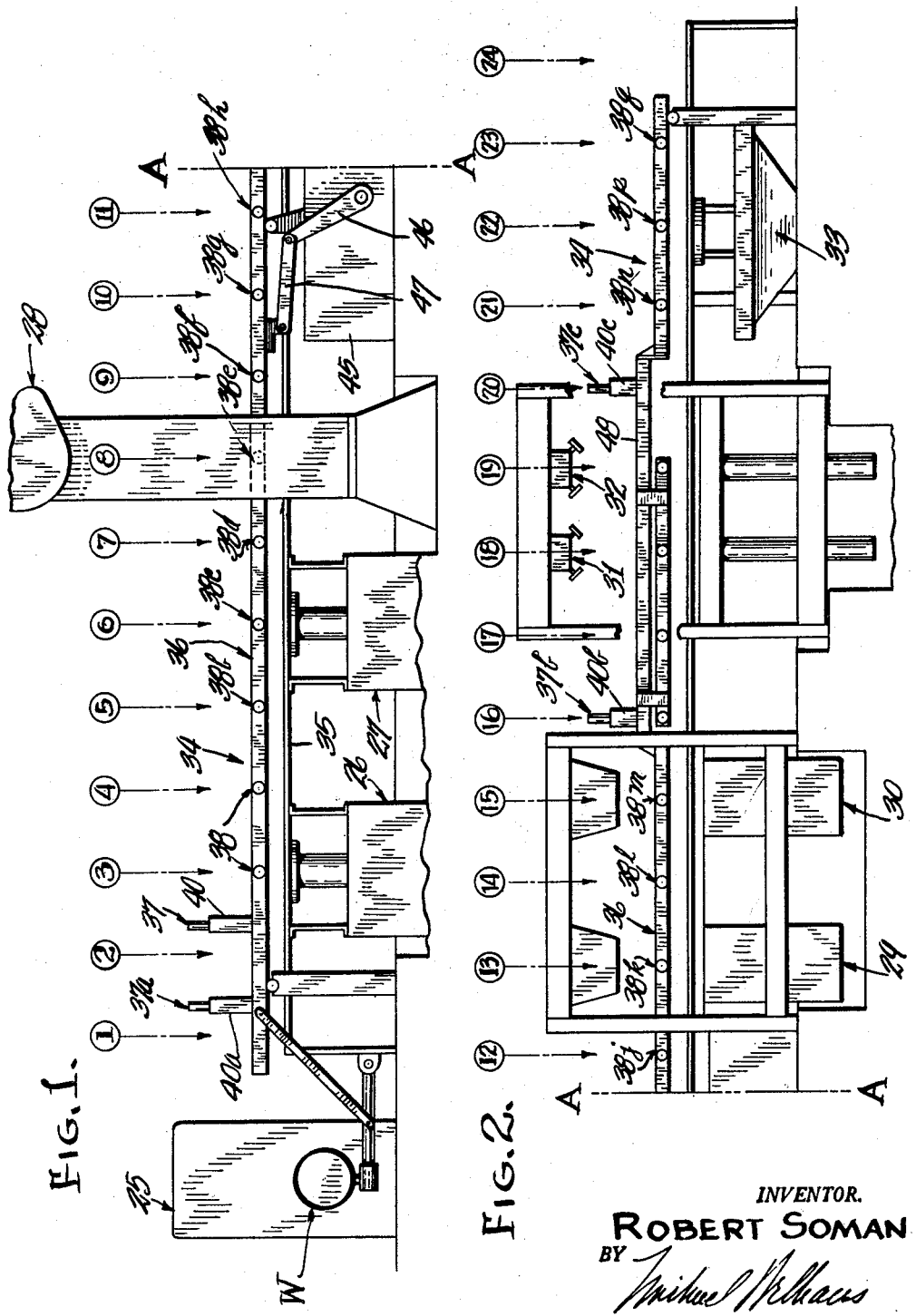
INVENTOR.
ROBERT SOMAN
BY
ATTORNEY

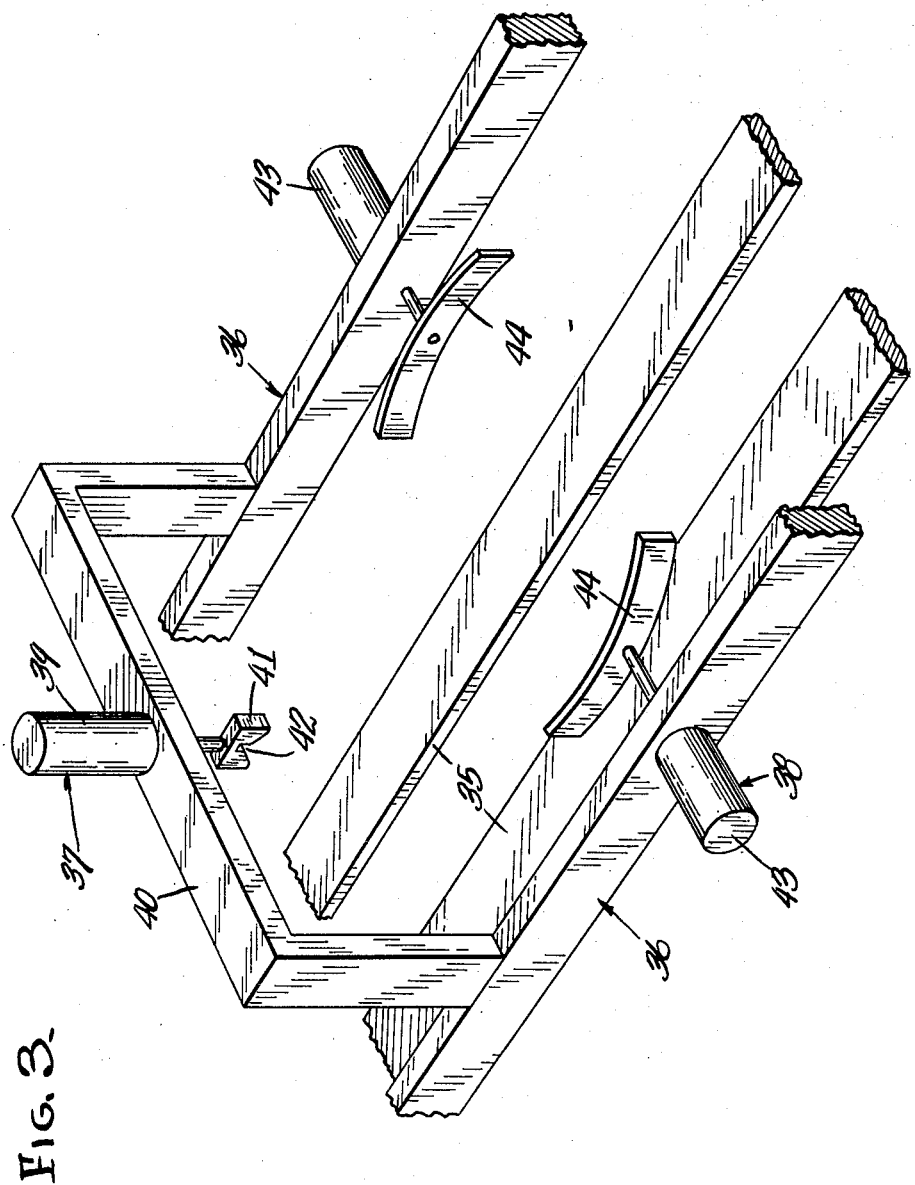

Sept. 22, 1964  R. SOMAN  3,149,712
BODY TRANSFERRING METHOD AND APPARATUS
Filed Oct. 21, 1960  5 Sheets-Sheet 3

INVENTOR.
ROBERT SOMAN
BY
*Michael Williams*
ATTORNEY

Sept. 22, 1964 R. SOMAN 3,149,712
BODY TRANSFERRING METHOD AND APPARATUS
Filed Oct. 21, 1960 5 Sheets-Sheet 4
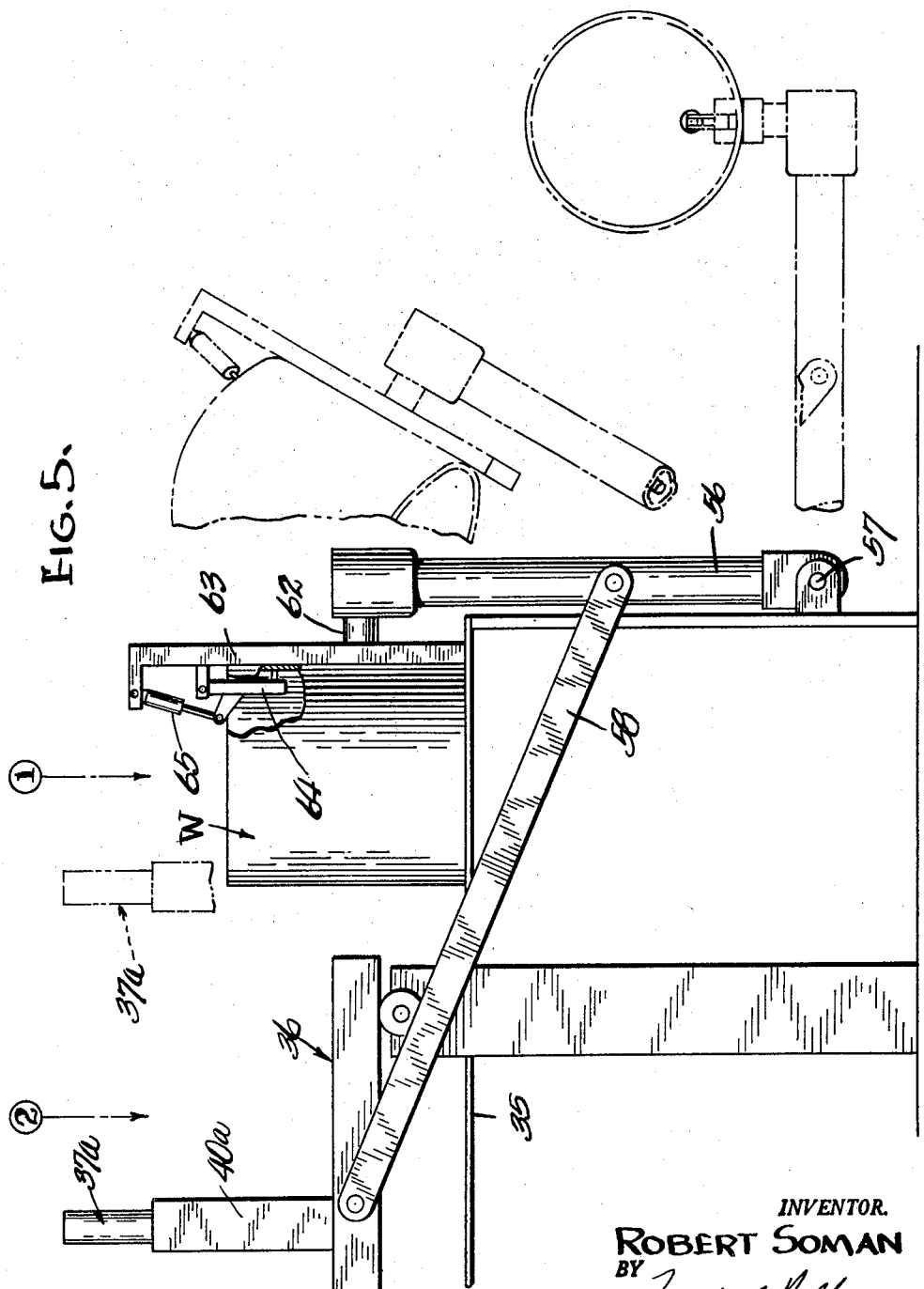
INVENTOR.
ROBERT SOMAN
BY
ATTORNEY

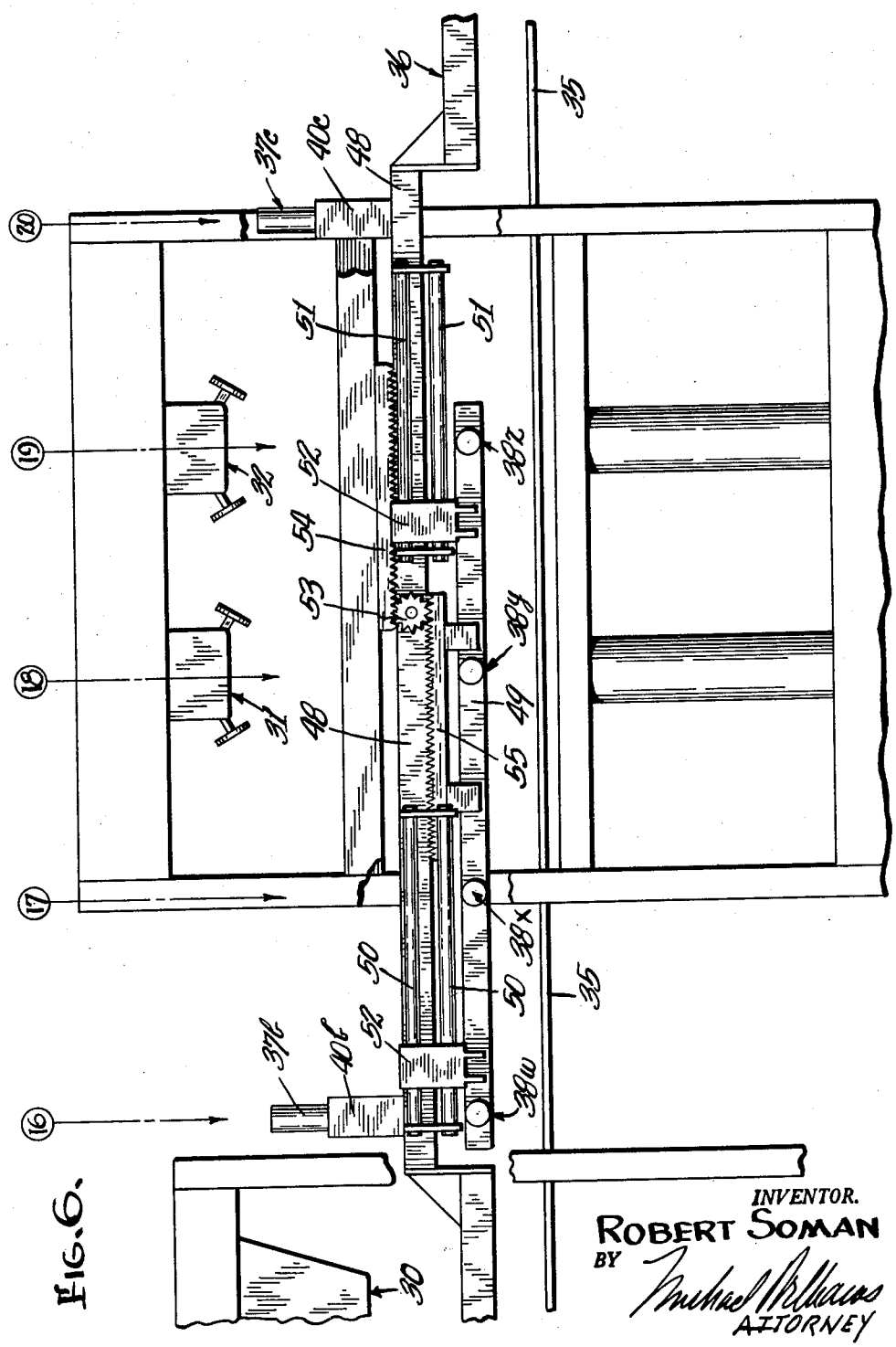

United States Patent Office

3,149,712
Patented Sept. 22, 1964

1

3,149,712
BODY TRANSFERRING METHOD AND
APPARATUS
Robert Soman, Warren, Ohio, assignor, by mesne assignments, to The McKay Machine Company, Youngstown, Ohio, a corporation of Ohio
Filed Oct. 21, 1960, Ser. No. 64,176
7 Claims. (Cl. 198—19)

The present invention relates to a method of transferring bodies between body working devices and to apparatus for practising such method, and the principal object of the invention is to provide new and improved methods and apparatus of the character described.

Many articles of manufacture require that a series of operations be performed thereon and when such operations are machine operations to be performed successively by respective devices, it has long been common practise in the mass-production field to utilize a transfer mechanism to shift the articles, or bodies, in succession from one device to another.

In many operational sequences, a problem arises when one or more of the body working devices functions at a lower rate of speed than the others since this necessitates a rate of production no greater than that of the slowest device. While it is, of course, possible to double production by duplicating each device to thus provide two lines, this is expensive. Moreover, there would still exist the wasteful practise of operating many of the devices at less than their optimum rate simply because one of the devices in the line cannot be operated at as high a rate as the others.

In a production line of various body working devices, one of which inherently functions at a lower rate than the others, the present invention contemplates providing as many of the slow functioning devices as necessary so that their cumulative operating rate is at least as great as the operating rate of the other devices in the line. The invention further contemplates so transferring the bodies being worked toward and away from a high operating rate device that the latter can function at its optimum high speed and also transferring such bodies to respective slow operating devices whereby each of the latter may operate at its lower optimum operating rate. The manner in which the foregoing has been accomplished and other objectives of the present invention will readily become apparent from a study of the following description and from the appended drawings.

Figure 4:
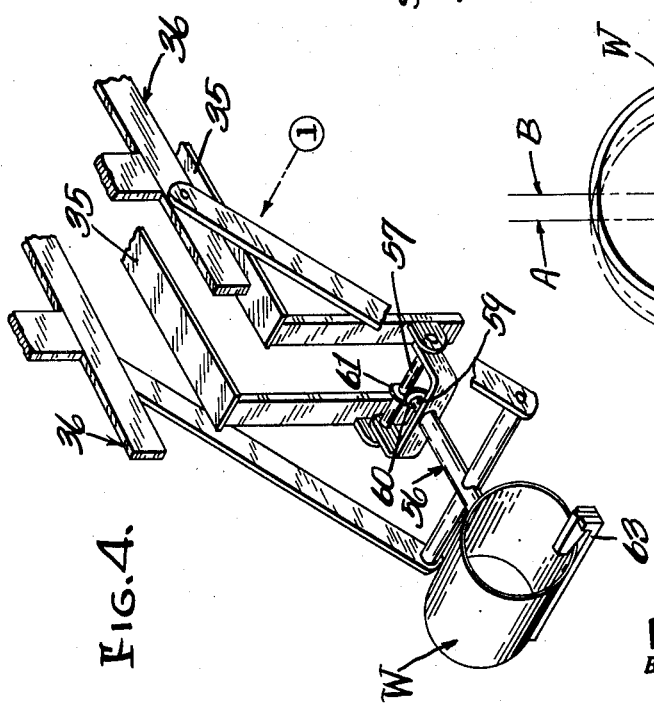

In the drawings accompanying this specification and forming a part of this application there is shown, for purpose of illustration, an embodiment which the invention may assume, and in these drawings:

FIGURES 1 and 2 are side elevational views of respective ends of a production line embodying the present invention, and views being adapted to be joined along the plane A—A to form the complete line, FIGURE 3 is an enlarged, fragmentary perspective view of certain details, FIGURE 4 is an enlarged, fragmentary perspective view of other details, FIGURE 5 is a further enlarged, fragmentary view of the details seen in FIGURE 4 but in another position of operation, FIGURE 6 is a view similar to FIGURE 2 but only of the intermediate part thereof, such view being enlarged to show greater detail, FIGURE 7 is a chart showing the flow of work pieces along a portion of the apparatus seen in FIGURE 2, and

2

Figure 8:
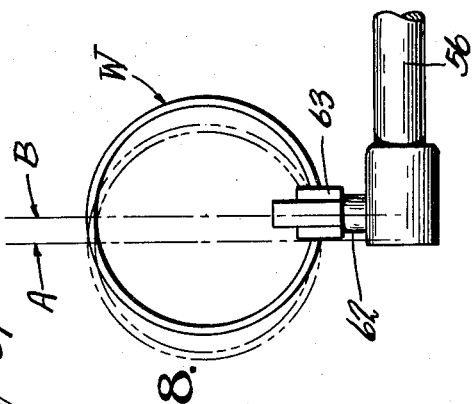

FIGURE 8 is a fragmentary view of certain parts seen in FIGURES 1, 4 and 5.

Briefly, and by way of explanation but not to be considered as a limitation, the present embodiment of the invention is adapted to form a piece of flat sheet metal to tubular form and to secure adjoining sheet edges together, as by welding, to provide an open-ended cylinder. Such cylinder is then successively passed to respective devices which size, pierce and trim the cylinder and which attach certain brackets thereto and secure a closure to one end thereof. The devices for performing these various operations are well-known in the art and form no part of the present invention; hence, they are shown more or less diagrammatically in the accompanying drawings. The present invention resides in the method of and the apparatus for transferring the cylindrical bodies between the various operating devices and in the arrangement of the latter and is not limited to the types of operating devices or to their specific construction.

With reference to FIGURES 1 and 2, there is illustrated a plurality of devices 25 through 33 preferably arranged in single file relation. As presently disclosed, device 25 is adapted to successively receive flat pieces of sheet metal and to roll the latter so that opposed sides are in adjoining relation. This device then seam-welds the adjoining edges together to provide an open-ended cylindrical body W.

Device 26 is an expander which stretches the cylindrical body to the precise size desired and which forms its upper end radially inwardly to partially close the latter.

Device 27 is a piercer which forms certain holes, indentations and protusions in the body.

Device 28 is a press which trims the formed-over, upper end of the body to provide an accurately sized and properly located aperture thereat.

Device 29 positions a plate-like member on the upper end of the body in register with the aperture therein and tack welds such plate to the body to retain it in proper position thereon.

Device 30 assemblies certain brackets with the body and welds them in position.

Devices 31 and 32 are identical, each being a seam-welder which welds the juxtaposed edges of the body and the previously mentioned plate to form a water-tight juncture therebetween.

The final device, 33, positions certain brackets on the body and welds them in position thereon.

Interconnecting the aforesaid devices 25 through 33 for the purpose of shifting the cylindrical bodies between such devices is transfer apparatus generally indicated at 34. Briefly, such transfer apparatus comprises fixedly positioned, spaced rails 35 (see also FIGURES 3 and 4) extneding between the devices 26 through 33 along which the bodies are slidable and spaced arms 36 disposed above the rails for receiving the bodies therebetween and reciprocably extending between the devices 26 through 33 for a purpose to appear. In a manner to be disclosed, arms 36 effect movement of successive cylindrical bodies along the rails 35 to the various positions (or stations) identified by the encircled reference characters 1 through 24. In the present embodiment, device 26 is positioned at station 3, device 27 at station 6, device 28 at station 8, device 29 at station 13, device 30 at station 15, device 31 at station 18, device 32 at station 19, and device 33 at station 22. At the remaining stations; i.e., stations 1, 2, 4, 5, 7, 9, 10, 11, 12, 14, 16, 17, 20, 21, 23 and 24, no work is performed upon the bodies, the latter merely being momentarily stored thereat prior to movement therefrom.

As previously mentioned, arms 36 are spaced to clear the bodies but carry means selectively engageable therewith to effect body movement during arm movement in one direction and disengageable from the bodies during arm movement in the opposite direction. The selectively engageable means above-referred to are of two general types and as seen in FIGURE 3, one type comprises a top clamp 37 and the other comprises a side clamp 38.

Top clamp 37 is herein illustrated as a vertically disposed fluid cylinder 39 secured to a bridge structure 40 which joins the arms 36 together to provide a unitary structure. The piston rod of cylinder 39 extends through an aperture in the bridge structure and has an enlarged lower end 41 provided with a downwardly facing slot 42 of a size to closely receive therein the wall of the cylindrical body. The lower portion of slot 41 may be flared outwardly to facilitate entry therein of the body wall. From the foregoing, it will be understood that when fluid cylinder 39 is actuated to lower the rod enlargement 41, its slot 42 will receive the wall of a properly positioned, vertically disposed cylindrical body. Movement of the arms 36 will now cause the cylindrical body to be slid along the rails 35. With the rod enlargement raised out of body engagement, however, the arms 36 will move independently of the body, the latter remaining in fixed position upon the rails.

Side clamp 38 is herein illustrated as a pair of horizontally disposed fluid cylinders 43 secured in opposed relation to respective arms 36 with their piston rods extending toward each other. The free end of each piston rod carries an arcuate shoe 44 for cooperation with respective sides of a vertically disposed cylindrical body. When fluid cylinders 43 are actuated to move shoes 44 toward each other, they will grip a body disposed therebetween so that movement of the arms will cause body movement along the rails 35. When the shoes are retracted away from body engagement, the arms may move independently of the body.

From a study of FIGURES 1 and 2, it will be seen that in addition to top clamp 37, there are also provided substantially similar top clamps 37a, 37b, and 37c spaced longitudinally along the arms 36. Also, in addition to side clamp 38, there are provided similar side clamps 38a, 38b, 38c, 38d, 38e, 38f, 38g, 38h, 38j, 38k, 38l, 38m, 38n, 38p, and 38q. Top clamps 37a, 37b, and 37c are secured to respective bridge structures 40a, 40b and 40c, which may be similar to bridge structure 40. Additionally, although not shown, one or more additional bridge structures similar to 40 may be spaced along the arms 36 to provide the necessary rigidity therebetween.

Any suitable means may be provided for reciprocating the arms 36 and as shown in FIGURES 1 and 2, a suitable drive mechanism is disposed in a housing 45 interposed between the devices 28, 29 beneath the rails 35. An oscillating arm 46 is connected to drive mechanism within the housing and a link 47 pivotally connects the free end of arm 46 with the near arm 36. If desired, an identical arm and link may be disposed on the far side of the housing for connection to the far arm 36 although this need not be done since the arms are connected together for unitary movement by the bridge members 40, 40a, 40b and 40c.

As shown in FIGURE 2 but as best may be seen in the enlarged view FIGURE 6, adjoining portions of each of the arms 36 adjacent devices 31, 32 are off-set upwardly at 48 for a purpose to appear. Suspended beneath each arm portion 48 in alignment with respective main arm portions 36 are supplemental arms 49 which are simultaneously reciprocable with the arms 36 but at an accelerated rate relative thereto.

While any suitable arrangement may be employed to secure the supplemental arms 49 to respective arms portions 48, in the present embodiment and referring to FIGURE 6, a pair of vertically spaced, parallel rods 50 are bracketed to the left (in the position of parts viewed) side of the near arm portion 48. A pair of similar rods 51 are bracketed to the right side of the near arm portion 48 in axial alignment with the rods 50. Identical pairs of rods will be bracketed to the far arm portions 48 in side-by-side relation with the rod pairs 50, 51. Secured to respective ends of the near supplemental arm 49 are brackets 52 which are slidable along respective near side rod pairs 50, 51. Similar brackets secure the far side supplemental arm to the far side rod pairs as will be understood.

The present means for controlling movement of the supplemental arms 49 relative to the main arms 36 is as follows: it being understood that while only the near side construction will be described, an identical construction will be provided on the far side.

Still referring to FIGURE 6, the near side, off-set arm portion 48 rotatably supports a gear 53. This gear meshes with a fixed rack 54 which extends longitudinally of the arms 36 and which may conveniently be supported by a portion of the structural framework which supports the welding devices 31, 32. Also meshed with the gear 53 is a rack 55, parallel with rack 54, but carried by and movable with the near side supplemental arm 49.

The function of gears 53 and their associated parts will be as follows:

Upon movement of arms 36 to the right from the position seen in FIGURE 6, gear 53 will be shifted to the right as it is secured to its off-set arm portion 48. As the gear is shifted to the right, it will be simultaneously rotated in a counter-clockwise direction (in the position of parts viewed) since it is meshed with its stationary rack 52. Such rotation of the gear will cause movement to the right of the rack 55 and its attached supplemental arm 49. The arrangement is such that movement of arms 36 to the right a predetermined amount will effect simultaneous movement to the right of supplemental arms 49 along their rod pairs an amount precisely twice that of arms 36. Reverse movement of arms 36 will, of course, effect reverse movement of supplemental arms 49 at the aforesaid two to one ratio.

For a purpose to appear, supplemental arms 49 carry longitudinally spaced side clamps 38w, 38x, 38y and 38z which may be identical to the previously described side clamps 38.

With reference once again to FIGURE 1, the device 25 is preferably of the type disclosed in Letters Patent 2,771,046, which device discharges the cylindrical bodies with their axes generally horizontal. Since the remaining devices 26 through 33 require that the cylindrical bodies be delivered thereto with their axes generally vertical, means are provided for shifting the axes of the bodies as they are transferred from device 25 to device 26.

As viewed in FIGURES 1, 4 and 5, an arm 56 is pivoted about the axis of a stationary pin 57 from a horizontal to a vertical position. Links 58 pivotally connect respective arms 36 to the arm 56 to provide for pivotal movement of the latter about the axis of pin 57 upon horizontal movement of the arms 36. Arm 56, in the present embodiment, is hollow and rotatably supported therein is a shaft 59 (FIGURE 4) whose end adjacent the pin 57 carries a bevel gear 60. Gear 60 meshes with a bevel gear 61 non-rotatably secured to the fixed pin 57. Although not shown, the opposite end of the shaft 59 at the free end of arm 56 carries a bevel gear which meshes with another bevel gear carried by a cross-shaft 62 rotatably carried by the free end of the arm.

From the construction thus far described, it will be understood that pivotal movement of arm 56 will cause its gear 60 to "walk" about the fixed gear 61 thus causing rotation of shaft 59 about its axis. Rotation of shaft 59 will be transmitted to simultaneous rotation of the cross-shaft 62 because of the above-disclosed gear connection therebetween.

Suitably secured to the shaft 62 for rotation therewith is a cylindrical body support member 63. Carried by member 63 is a clamping device 64 presently actuated by a fluid cylinder 65 for selectively clamping a cylindrical body to the support member 63.

Assuming that the various parts are disposed as seen in FIGURES 1, 2, 3 and 6, full lines in FIGURE 4 and the extreme phantom line position seen in FIGURE 5, and further assuming that the transfer mechanism 34 and all the various body working devices are devoid of the cylindrical body work pieces, operation will be as follows:

Device 25 will be actuated to form a cylindrical body from a flat piece of sheet metal and will eject such body onto the support member 63, the clamping device 64 at this time being in position wherein it does not interfere with body placement. Cylinder 65 will then be actuated to shift clamping device 64 to position wherein the body is clamped against the support member 63. Arms 36 of the transfer mechanism will next be shifted to the right (as viewed in FIGURES 1 and 2) to the position seen in FIGURE 5. Such arm movement will be equal to the spacing between any two adjoining stations which are indicated at 1 through 24.

Movement of arms 36 will cause pivotal movement of the arm 56 about its pivot to the full line position seen in FIGURE 5. Simultaneously with the movement aforesaid of arm 56, cross-shaft 62 will be rotated ninety degrees so that the cylindrical body W will be positioned on the rails 35 with its axis vertically disposed. Cylinder 65 will release the clamping device 64 to disengage the body from the member 63 whereupon return movement of arms 36 will condition the mechanism for receipt of a second body discharged from device 25, it being understood that the first body remains at station 1 for the time being.

Upon disposition of a second cylindrical body upon the member 63, top clamp 37a will be actuated to engage the first cylindrical body now resting at station 1. Arms 36 will once again be shifted as before described thus sliding the first body to station 2 and depositing the second body at station 1. Return movement of the arms 36 will leave the first and second bodies at stations 2 and 1 respectively since top clamp 37a will be disengaged from the first body prior to return arm movement.

A third cylindrical body will now be disposed by the device 25 on the member 63 and the top clamps 37, 37a actuated to engage the first and second bodies respectively. Movement of arms 36 to the left will shift the first body along the rails 35 to station 3, the second body to station 2, and the third body to station 1. Arms 36 will then return leaving the first, second and third bodies at stations 3, 2 and 1 respectively.

With the first body now positioned at station 3, at which station is located the device 26, a suitable elevator device (not shown but which may in part form an adjoining portion of the body supporting rails 35) will lower such first body to operative relation with device 26. The latter will now be actuated to, in the present instance, expand and otherwise form the body. Following the expansion of the first body by device 26 such body will be returned to its normal position upon the rails 35 to await the next cycle of movement of the arms 36.

Upon disposition of a fourth cylindrical body upon the member 63, side clamp 38 and top clamps 37, 38a will be actuated to respectively grip the first, second and third bodies whereupon subsequent movement of the arms 36 will position the first body at station 4, the second body at station 3, the third body at station 2 and the fourth body at station 1. Device 26 may thereupon be actuated to work the second body either during return of arms 36 to their original position, the clamps aforesaid releasing during return arm movement, or subsequent to return arm movement.

The above-described operations will continue, as outlined, to advance the cylindrical bodies in order along successive stations, it being understood that each of the clamps carried by arms 36, with the exception of top clamps 37b and 37c and side clamps 38w, 38x, 38y and 38z (which clamps operate alternately as will later appear), will be actuated to grip an adjoining body prior to each cycle of movement of arms 36 to the right in the position of parts seen in FIGURES 1 and 2 and such clamps will be actuated to release their grip on respective bodies prior to return movement of such arms. It will also be understood each of the body working devices 26 through 30 and 33 will perform its work upon adjoining bodies in succession following movement of the arms 36 to the right and prior their subsequent movement in this direction on the next cycle of operations.

Assuming that arms 36 have been shifted to the right fifteen times, the first body will have progressed to station 15, the second body to station 14, the third body to station 13, et cetera. This position of the first body at station 15 following the fifteenth stroke of arms 36 is indicated in the chart (FIGURE 7). With the first body at station 15, device 30 will be operated to weld certain brackets to this body while the devices 29, 28, 27 and 26 also operate simultaneously to perform their individual functions on the third, eighth, tenth and thirteenth bodies respectively positioned at stations 13, 8, 6 and 3. Upon a completion of a cycle of operations of the devices 26, 27, 28, 29 and 30, arms 36 will be shifted to the right to thus advance the first body to station 16, the second body to station 15, et cetera. Following a return of arms 36 to their original positions and following completion of another cycle of operations of the devices 26 through 30, the next stroke (the seventeenth) of the arms 36 will advance the first body to station 17, the second body to station 16, et cetera.

With the arms 36 returned to their original positions following the seventeenth stroke, the parts being disposed as seen in FIGURES 2 and 6, it is to be noted that the side clamps 38x are at this time disposed at station 17 while the side clamps 38y are disposed at station 16. These clamps will now be actuated to grip the first and second bodies respectively prior to the next (eighteenth) stroke of the arms 36. For reasons to become clear, top clamp 37b will not be actuated to grip a body during this next stroke of the arms.

Upon movement of arms 36 on their eighteenth stroke to the right, the first and second bodies will be advanced two stations rather than one, because they are gripped by the side clamps carried by the supplemental arms 49, which arms move at a two to one ratio with the arms 36 as previously disclosed. Thusly, the first body will be shifted from station 17 to station 19 while the second body will be simultaneously shifted from station 16 to station 18 (see FIGURE 7). The return of arms 36 (and supplemental arms 49 also of course) to their original positions will leave the first and second bodies at stations 19 and 18 respectively since the side clamps 38x, 38y will be retracted from body engagement. During the movement aforesaid of the first and second bodies, the remaining bodies will each be advanced one step as before described, the third body advancing to station 16, the fourth to station 15, the fifth to station 14, et cetera.

During the next, or nineteenth, stroke of arms 36 to the right, the first and second bodies will remain at stations 19, 18, while the relatively slow seam welders 32, 32 perform their operational cycles. Accordingly, each welder device 31, 32 has approximately twice as much time to complete its cycle as do the other devices 25, 26, 27, 28, 29, 30 and 33. The preceding portions of the line, however, operate as before described, top clamp 37b now functioning to grip the third body to cause movement thereof to station 17 while the fourth body is advanced to station 16, the fifth advanced to station 15, the sixth to station 14, et cetera. During this stroke of arms 36 to the right and their return, side clamps 38w, 38x, 38y and 38z will not be actuated to grip a body as will be evident.

At the twentieth stroke of arms 36 to the right, welding devices 31, 32 having completed their respective operational cycles, clamps 38z, 38y, 38x and 38w will be actuated to respectively grip the first, second, third and fourth bodies at stations 19, 18, 17 and 16 respectively, top clamps 37b and 37c being retracted from body engagement at this time. Movement of the arms 36 to the right will cause movement of the supplemental arms 49 as before described to advance the first body to station 21, the second to station 20, the third to station 19 and the fourth to station 18. Succeeding bodies will, of course, be advanced one step, the fifth body advancing to station 16, the sixth to station 15, the seventh to station 14, et cetera.

At the commencement of the twenty first stroke of arms 36, side clamp 38n (FIGURE 2) will grip the first body while top clamp 37c will grip the second body whereby the first body will be advanced to station 22 and the second will be advanced to station 21 during such stroke. During this stroke, side clamps 38w, 38x, 38y and 38z will remain retracted to permit the welding devices 31, 32 to continue uninterruptedly their operating cycles on bodies 4 and 3 respectively, the fifth body, however, being advanced to station 17, the sixth body being advanced to station 16, the seventh body being advanced to station 15, et cetera.

On the next (twenty second) stroke of the arms 36, and after device 33 has performed its designed operation on the first body, the latter will be advanced to station 23, the second body will be advanced to station 22, the third will be advanced to station 21, the fourth to station 20, the fifth to station 19, the sixth to station 18, the seventh to station 16, the eighth to station 15, et cetera.

Finally, on the twenty third stroke of arms 36, the first body will be advanced to station 24, from which it may be removed for storage or other processing or assembly, the second body will be advanced to station 23, the third to station 22, the fourth to station 21, the fifth and sixth bodies will remain at respective stations 19 and 18 until the next stroke, the seventh body will be advanced to station 17, the eighth to station 16, the ninth to station 15, the tenth to 14, et cetera.

As will be understood, the foregoing steps will continue so long as cylindrical bodies are discharged by the forming device 25. It will also be understood that while the present apparatus functions at such rate that only two seam-welding devices 31, 32 need be provided, other apparatus might require three or more seam-welders. In such case, the supplemental arms 49 would then operate at a three to one ratio with the arms 36 rather than at a two to one ratio as herein disclosed. Furthermore, it is to be understood that the body working devices have been disclosed for illustrative purposes only and that the invention contemplates the use of other types of body working devices. Additionally, while it was only necessary in the present embodiment to duplicate one type of device (the seam-welder device), other production lines might require duplication of more than one of the types of devices employed in order to obtain optimum use of equipment.

While the construction thus far disclosed is quite satisfactory, a problem sometimes arises depending upon what types of operations are performed at the various working stations. Such a problem may exist by virtue of the fact that device 25 is normally designed so that the longitudinal seam formed in the cylindrical body W is uppermost as such member is discharged onto support member 63. Thereafter, as such body is transferred to station 1, such seam will be in alignment with a plane longitudinally bisecting the arms 36.

For reasons which need not be disclosed since such disclosure would unnecessarily complicate this specification, it is sometimes desirable to deposit the cylindrical body W on the support rails 35 with the seam aforesaid to one side or the other of the plane above-mentioned. The manner in which this is effectuated is illustrated in FIGURE 8.

With reference to this figure, device 25 will be arranged to discharge the bodies W, as shown in phantom, along a vertical plane A which is spaced slightly to the left (in the position of parts shown) of the vertical plane B of the body after it is clamped to the support member 63 by the clamping device 64. Thus, a body will be discharged by the device 25 onto the support member 63 as shown in phantom lines. Thereafter, since such position of the body is off-center of the clamping device, actuation of the latter to clamp the body in place will cause rotation thereof to the full line position. This will shift the longitudinal seam of the body so that it is no longer uppermost and thus such seam will be disposed to one side of a plane longitudinally bisecting the arms 36 when the body is deposited at station 1.

While normal operation of the apparatus herein shown contemplates the continuous use of both seam welders 31, 32, circumstances may arise when one is inoperable as a result of a breakdown or because of certain maintenance requirements. At such time, it is still possible to operate the line as before, but at one-half speed. This may be accomplished simply by locking supplemental arms 49 to respective arms 36 so that all move together at the same rate. Various expedients may be used to accomplish this; however, a preferred arrangement is to remove each of the racks 54 and to lock each of the gears 53 against rotation by passing a pin through an aperture formed in each gear radially outwardly of its axis and into a corresponding, aligned aperture formed in respective arm portions 48.

In view of the foregoing it will be apparent to those skilled in the art that I have accomplished at least the principal object of my invention and it will also be apparent to those skilled in the art that the embodiment herein described may be variously changed and modified, without departing from the spirit of the invention, and that the invention is capable of uses and has advantages not herein specifically described; hence it will be appreciated that the herein disclosed embodiment is illustrative only, and that my invention is not limited thereto.

I claim:

1. Transfer apparatus for moving bodies in step-by-step relation, comprising a first body transfer means moving intermittently through a predetermined distance and engageable with a body during a cycle of operation to shift such body to a predetermined position, drive means for effecting movement of said body transfer means, and a second body transfer means having driving connection and moving with said first body transfer means through a different predetermined distance and engageable with a body during a cycle of operation to shift such body from said predetermined position.

2. The construction of claim 1 wherein one of said body transfer means skips at least one body transfer cycle out of every two body transfer cycles of the other of said body transfer means.

3. The construction of claim 2 wherein said one transfer means carries a member movable toward body engagement to effect a body transfer cycle upon movement of such transfer means and wherein said member is movable away from body engagement to skip a body transfer cycle despite movement of such transfer means.

4. The construction of claim 1 wherein said first and second body transfer means have direct mechanical interconnection to insure in-phase movement thereof.

5. The construction of claim 4 wherein gear means provides the direct mechanical interconnection aforesaid.

6. The construction of claim 1 wherein each body transfer means has a reciprocably mounted portion, wherein the second means portion is carried by the first for reciprocatory movement relative thereto, wherein a first toothed rack member is mounted on said second means portion for movement therewith, wherein a second toothed rack member is in laterally spaced, opposed, facing relation with said first and is fixed against movement, and wherein a gear is rotatably carried by said first transfer means portion in engagement with the teeth of respective racks.

7. The construction of claim 6 wherein said second transfer means carries a member movable toward body engagement to effect a body transfer cycle upon reciprocation of such transfer means and wherein said member is movable away from body engagement to skip one body transfer cycle out of every two body transfer cycles of said first transfer means despite reciprocation of said second transfer means.

References Cited in the file of this patent

UNITED STATES PATENTS

| | | |
|---|---|---|
| 1,467,409 | Wilkinson | Sept. 11, 1923 |
| 1,794,424 | Smith | Mar. 3, 1931 |
| 1,835,579 | Westin | Dec. 8, 1931 |
| 2,005,522 | Holm | June 18, 1935 |
| 2,060,561 | Fausset | Nov. 10, 1936 |
| 2,555,227 | Emerson | May 29, 1951 |
| 2,792,921 | Sharpe | May 21, 1957 |
| 2,934,194 | Adams | Apr. 26, 1960 |
| 2,935,172 | Todoroff | May 3, 1960 |